(12) United States Patent
Andoh et al.

(10) Patent No.: US 10,668,817 B2
(45) Date of Patent: Jun. 2, 2020

(54) DRIVING DEVICE

(71) Applicant: TOYOTA JIDOSHA KABUSHIKI KAISHA, Toyota-shi, Aichi-ken (JP)

(72) Inventors: Takahiro Andoh, Okazaki (JP); Yohsuke Tagawa, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 135 days.

(21) Appl. No.: 15/913,001

(22) Filed: Mar. 6, 2018

(65) Prior Publication Data

US 2018/0257496 A1 Sep. 13, 2018

(30) Foreign Application Priority Data

Mar. 10, 2017 (JP) .................................. 2017-046261

(51) Int. Cl.
*B60L 15/00* (2006.01)
*B60L 11/18* (2006.01)
(Continued)

(52) U.S. Cl.
CPC ......... *B60L 11/1812* (2013.01); *B60L 3/0046* (2013.01); *B60L 7/14* (2013.01); *B60L 7/16* (2013.01); *B60L 15/007* (2013.01); *B60L 15/2045* (2013.01); *B60L 53/22* (2019.02); *B60L 58/15* (2019.02); *H02J 7/1461* (2013.01); *H02J 7/166* (2013.01); *H02P 27/08* (2013.01); *B60L 2210/14* (2013.01); *H02M 3/1584* (2013.01); *H02P 3/18* (2013.01);
(Continued)

(58) Field of Classification Search
CPC .... B60L 15/00; B60L 7/00; H02J 7/00; F02N 11/00
USPC ........................................................ 307/10.7
See application file for complete search history.

(56) References Cited

U.S. PATENT DOCUMENTS

2009/0171554 A1* 7/2009 Yaguchi ................. B60K 6/445
701/112
2010/0019734 A1* 1/2010 Oyobe .................... H02J 7/022
320/162
(Continued)

FOREIGN PATENT DOCUMENTS

JP 2010-233384 A 10/2010
JP 2010233384 A * 10/2010
(Continued)

*Primary Examiner* — Rexford N Barnie
*Assistant Examiner* — Joseph N Inge
(74) *Attorney, Agent, or Firm* — Sughrue Mion, PLLC

(57) ABSTRACT

A driving device includes a motor; a power storage device; a first boost converter configured to exchange power by voltage conversion between a power storage device side and a motor side; a second boost converter connected to the first boost converter in parallel and configured to exchange power by voltage conversion between the power storage device side and the motor side; and an electronic control unit configured to control the first boost converter and the second boost converter. The electronic control unit controls the first boost converter and the second boost converter such that the loss of each of the first boost converter and the second boost converter is not minimized during an excessive power input in which power to be input to the power storage device from the motor side is greater than an input limit of the power storage device.

5 Claims, 4 Drawing Sheets

(51) Int. Cl.
*B60L 15/20* (2006.01)
*H02J 7/14* (2006.01)
*H02P 27/08* (2006.01)
*B60L 53/22* (2019.01)
*B60L 58/15* (2019.01)
*H02J 7/16* (2006.01)
*B60L 3/00* (2019.01)
*B60L 7/16* (2006.01)
*B60L 7/14* (2006.01)
*H02P 27/06* (2006.01)
*H02M 3/158* (2006.01)
*H02P 3/18* (2006.01)

(52) U.S. Cl.
CPC .......... *H02P 27/06* (2013.01); *H02P 2201/07* (2013.01); *Y02T 10/7005* (2013.01); *Y02T 10/7225* (2013.01); *Y02T 10/7241* (2013.01); *Y02T 10/7275* (2013.01); *Y02T 10/92* (2013.01); *Y02T 90/127* (2013.01)

(56) References Cited

U.S. PATENT DOCUMENTS

| | | | |
|---|---|---|---|
| 2010/0070133 A1* | 3/2010 | Ishishita | H01M 10/443 701/36 |
| 2010/0141213 A1* | 6/2010 | Iida | B60L 1/00 320/134 |
| 2011/0082611 A1* | 4/2011 | Shiba | B60K 6/445 701/22 |
| 2017/0155350 A1* | 6/2017 | Jojima | B60L 3/003 |
| 2017/0158189 A1* | 6/2017 | Kazuno | B60L 58/24 |
| 2017/0225571 A1* | 8/2017 | Jojima | B60L 50/51 |
| 2018/0232030 A1* | 8/2018 | Chan | H02J 7/0068 |

FOREIGN PATENT DOCUMENTS

| | | | |
|---|---|---|---|
| JP | 2016-100936 A | | 5/2016 |
| JP | 2016100936 A | * | 5/2016 |
| JP | 2016-111886 A | | 6/2016 |

* cited by examiner

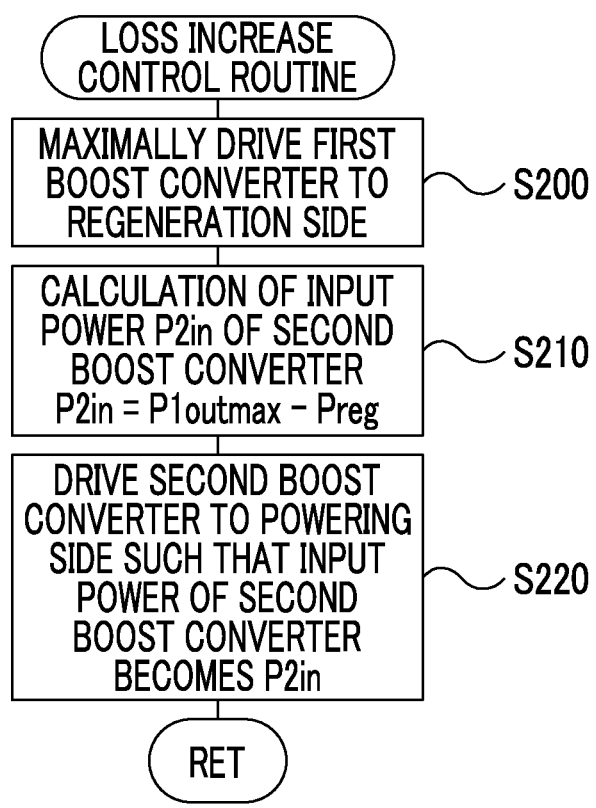

DRIVING DEVICE

INCORPORATION BY REFERENCE

The disclosure of Japanese Patent Application No. 2017-046261 filed on Mar. 10, 2017 including the specification, drawings and abstract is incorporated herein by reference in its entirety.

BACKGROUND

1. Technical Field

The present disclosure relates to a driving device, and in particular, to a driving device including a motor, a power storage device, and two boost converters.

2. Description of Related Art

In the related art, as the above-described type of driving devices, a driving device has been proposed which includes a motor, two power storage devices, and two boost converters that are respectively connected to the two power storage devices and exchange power with voltage conversion between the two power storage devices and the motor (for example, refer to Japanese Unexamined Patent Application Publication No. 2016-111886 (JP 2016-111886 A)). The driving device determines a power distribution ratio such that the loss of each of the two boost converters is minimized.

SUMMARY

However, in the driving device, in a case where a power storage ratio of the power storage device is increased, power (input limit) that may be input to the power storage device such that the input power to the power storage device is not excessive is reduced. Thus, regenerative power from the motor may exceed the input limit of the power storage device in some cases. In this case, in order to efficiently suppress overcharging of the power storage device, reducing a regenerative torque of the motor is considered, but the needed regenerative torque may not be obtained.

The disclosure provides a driving device which efficiently suppresses overcharging of a power storage device and causes a motor to output a needed regenerative torque.

An aspect of the invention relates to a driving device. The driving device includes a motor; a power storage device; a first boost converter configured to exchange power by voltage conversion between a power storage device side and a motor side; a second boost converter connected to the first boost converter in parallel and configured to exchange power by voltage conversion between the power storage device side and the motor side; and an electronic control unit configured to control the first boost converter and the second boost converter. The electronic control unit controls the first boost converter and the second boost converter such that the loss of each of the first boost converter and the second boost converter is not minimized during an excessive power input in which power to be input to the power storage device from the motor side is greater than an input limit of the power storage device.

According to the aspect of the disclosure, the electronic control unit can control the first boost converter and the second boost converter such that the loss of each of the first boost converter and the second boost converter is not minimized during the excessive power input in which power to be input to the power storage device from the motor side is greater than an input limit of the power storage device. That is, the first boost converter and the second boost converter are controlled such that the loss of each of the first boost converter and the second boost converter is greater than the minimum value of a loss of normal control. In this manner, some of the power from the motor side is consumed, and thus it is possible to cause the power that is to be input to the power storage device to be within an input limit range. Accordingly, there is no need to suppress the regenerative torque of the motor for causing the power that is to be input to the power storage device to be within the input limit range. As a result, it is possible to efficiently suppress overcharging of a power storage device and cause a motor to output a needed regenerative torque.

In the driving device according to the aspect of the disclosure, during the excessive power input, the electronic control unit may control one boost converter of the first boost converter and the second boost converter such that power is supplied from the motor side to the power storage device side, and control the other boost converter of the first boost converter and the second boost converter such that power is supplied from the power storage device side to the motor side. That is, the power from the motor side is supplied to the power storage device side by the one boost converter and the power from the power storage device side is supplied to the motor side by the other boost converter so that a loop of power passing through the one boost converter and the other boost converter is formed. By the forming of the loop of power as described above, the loss of each of the first boost converter and the second boost converter becomes greater than the minimum value of a loss of normal control. In the driving device according to the aspect of the disclosure, during the excessive power input, the electronic control unit may perform control such that the loss of each of the first boost converter and the second boost converter is maximized. In the driving device according to the aspect of the disclosure, during the excessive power input, the electronic control unit may perform control such that power input to the power storage device is equal to or less than the input limit. According to the aspect of the disclosure, it is possible to efficiently suppress overcharging of the power storage device.

In the driving device according to the aspect of the disclosure, during the excessive power input, the electronic control unit may control the first boost converter and the second boost converter such that the loss of each of the first boost converter and the second boost converter is greater than the minimum value of a loss of normal control.

In the driving device according to the aspect of the disclosure, the power input to the power storage device may be power obtained by subtracting second power input to the other boost converter from first power output from the one boost converter.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 5 is a flowchart showing an example of a loss increase control routine executed by the electronic control unit.

DETAILED DESCRIPTION OF EMBODIMENTS

Hereinafter, a mode for carrying out an embodiment will be described.

Figure 1:
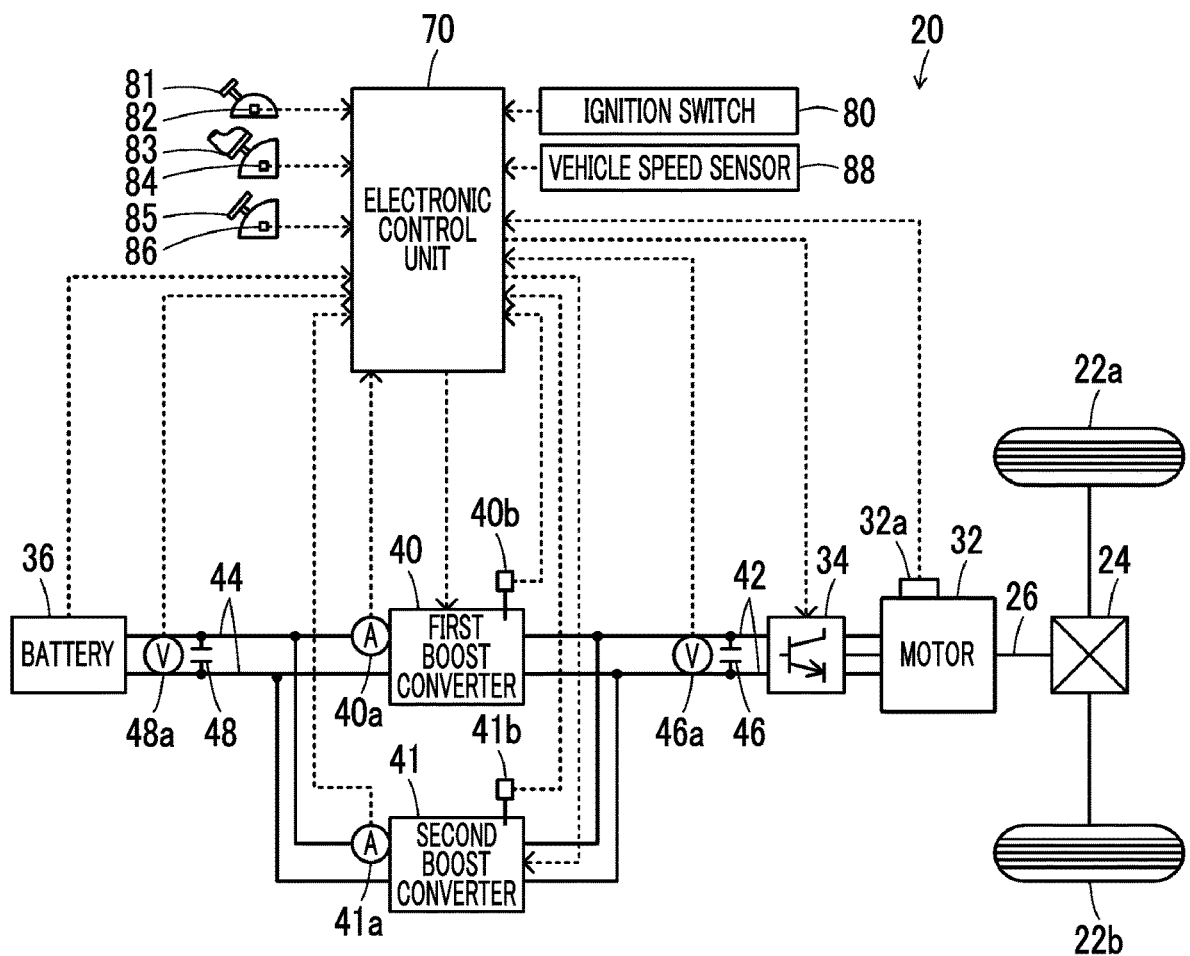
FIG. 1 is a schematic diagram showing the configuration of an electric vehicle in which a driving device as an embodiment is mounted.
Figure 2:
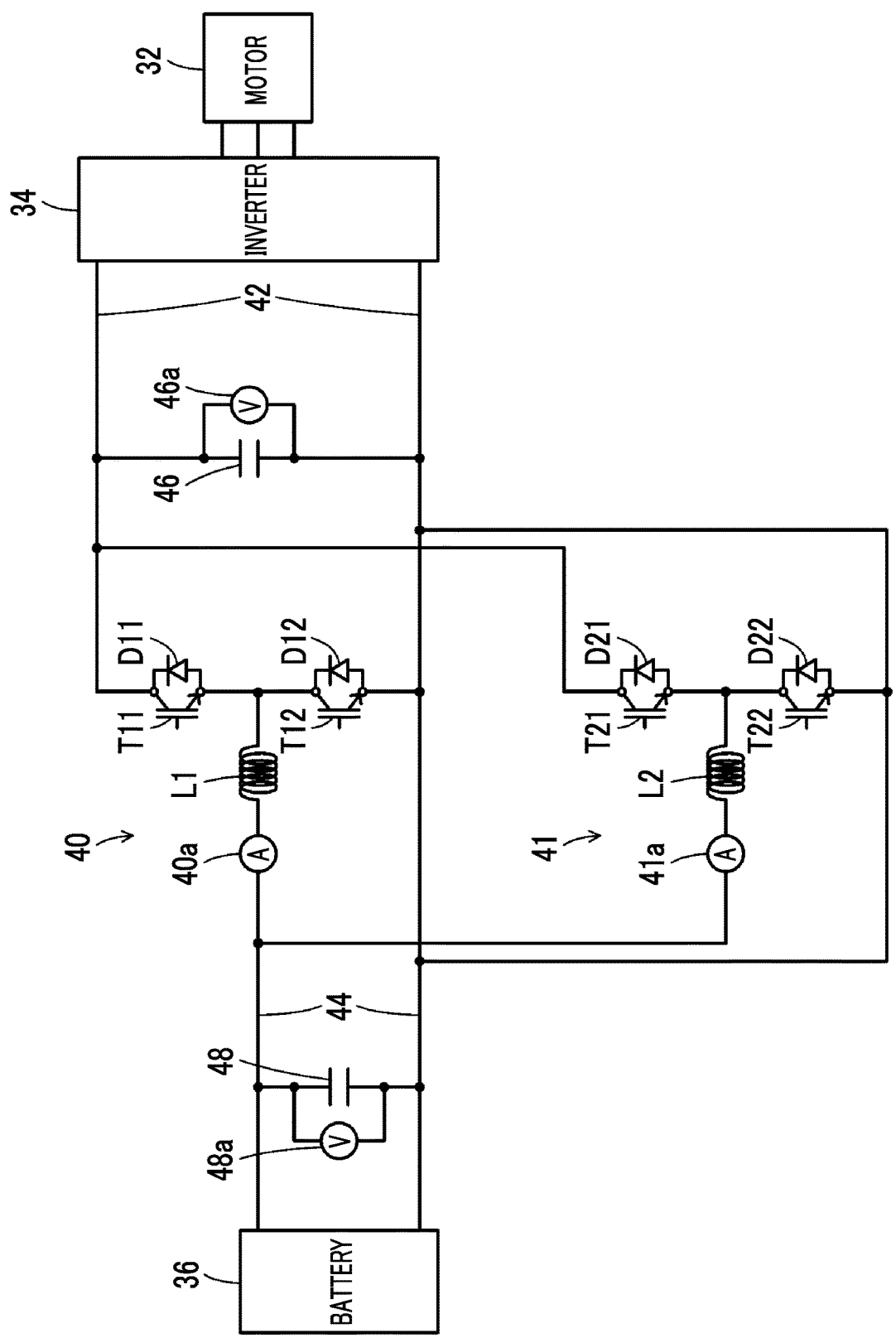
FIG. 2 is a schematic diagram showing the configuration of an electric driving system including a motor.

FIG. 1 is a schematic diagram showing the configuration of an electric vehicle 20 in which a driving device as an embodiment is mounted, and FIG. 2 is a schematic diagram showing the configuration of an electric driving system including a motor 32. As shown in FIG. 1, the electric vehicle 20 of the embodiment includes the motor 32, an inverter 34, a battery 36 as a power storage device, first and second boost converters 40, 41, and an electronic control unit 70. The motor 32, the battery 36, the first and second boost converters 40, 41, and the electronic control unit 70 are examples of a driving device of the embodiment.

The motor 32 is configured as, for example, a synchronous generator motor, and a rotor thereof is connected to a driving shaft 26 that is connected to driving wheels 22a, 22b through a differential gear 24. The inverter 34 is connected to the motor 32 and also connected to a high voltage side power line 42. The motor 32 is driven to rotate by performing switching control of a plurality of switching elements (not shown) of the inverter 34 by the electronic control unit 70. A smoothing capacitor 46 is connected to a positive side line and a negative side line of the high voltage side power line 42.

The battery 36 is configured, for example, as a lithium-ion secondary battery or a nickel hydrogen secondary battery, and is connected to a low voltage side power line 44 as a second power line. A smoothing capacitor 48 is connected to a positive side line and a negative side line of the low voltage side power line 44.

As shown in FIG. 2, the first boost converter 40 is configured as a well-known buck-boost converter that is connected to the high voltage side power line 42 and the low voltage side power line 44 and that has two transistors T11, T12, two diodes D11, D12, and a reactor L1. The transistor T11 is connected to the positive side line of the high voltage side power line 42. The transistor T12 is connected to the transistor T11 and the negative side lines of the high voltage side power line 42 and the low voltage side power line 44. The reactor L1 is connected to a connection point between the transistors T11, T12 and the positive side line of the low voltage side power line 44. By adjusting the ratio of the ON time between the transistors T11, T12 using the electronic control unit 70, the first boost converter 40 supplies the power of the low voltage side power line 44 to the high voltage side power line 42 according to a voltage rise, or supplies the power of the high voltage side power line 42 to the low voltage side power line 44 according to a voltage drop. Similarly to the first boost converter 40, the second boost converter 41 is configured as a well-known buck-boost converter that is connected to the high voltage side power line 42 and the low voltage side power line 44 and that has two transistors T21, T22, two diodes D21, D22, and a reactor L2. By adjusting the ratio of the ON time between the transistors T21, T22 using the electronic control unit 70, the second boost converter 41 supplies the power of the low voltage side power line 44 to the high voltage side power line 42 according to a voltage rise, or supplies the power of the high voltage side power line 42 to the low voltage side power line 44 according to a voltage drop.

Although not shown, the electronic control unit 70 is configured as a microprocessor mainly using a CPU, and includes not only the CPU but also a ROM for storing a processing program or a RAM for temporarily storing data, a nonvolatile flash memory, and an input/output port. As shown in FIG. 1, signals from various sensors are input to the electronic control unit 70 through the input port. Examples of signals input to the electronic control unit 70 include a rotation position θm from a rotation position detection sensor 32a for detecting the rotation position of the rotor of the motor 32 and phase currents Iu, Iv from a current sensor for detecting a current flowing in each phase of the motor 32. A voltage Vb from a voltage sensor provided between the terminals of the battery 36 and a current Ib from a current sensor connected to the output terminal of the battery 36 can also be mentioned as examples of signals input to the electronic control unit 70. A voltage VH of the high voltage side power line 42 (capacitor 46) from a voltage sensor 46a provided between the terminals of the capacitor 46 and a voltage VL of the low voltage side power line 44 (capacitor 48) from a voltage sensor 48a provided between the terminals of the capacitor 48 can also be mentioned as examples of signals input to the electronic control unit 70. Currents IL1, IL2 of the reactors L1, L2 from current sensors 40a, 41a for detecting currents flowing through the reactors L1, L2 of the first and second boost converters 40, 41 and temperatures tc1, tc2 of the first and second boost converters 40, 41 from temperature sensors 40b, 41b connected to the first and second boost converters 40, 41 can also be mentioned as examples of signals input to the electronic control unit 70. An ignition signal from an ignition switch 80 and a shift position SP from a shift position sensor 82 for detecting the operation position of a shift lever 81 can also be mentioned as examples of signals input to the electronic control unit 70. An accelerator operation amount Acc from an accelerator pedal position sensor 84 for detecting the stepped amount on an accelerator pedal 83, a brake pedal position BP from a brake pedal position sensor 86 for detecting the stepped amount on a brake pedal 85, and a vehicle speed V from a vehicle speed sensor 88 can also be mentioned as examples of signals input to the electronic control unit 70. Various control signals are output from the electronic control unit 70 through the output port. Examples of signals output from the electronic control unit 70 include a switching control signal output to a plurality of switching elements of the inverter 34, a switching control signal output to the transistors T11, T12 of the first boost converter 40, and a switching control signal output to the transistors T21, T22 of the second boost converter 41. The electronic control unit 70 calculates an electrical angle θe of the motor 32 or the number of rotations Nm of the motor 32 based on the rotation position θm of the rotor of the motor 32 from the rotation position detection sensor 32a. The electronic control unit 70 calculates a power storage ratio SOC of the battery 36 based on a cumulative value of the current Ib of the battery 36 obtained from the current sensor, or calculates an input limit Win and an output limit Wout which are the maximum allowable power by which the battery 36 may be charged and discharged, based on the calculated power storage ratio SOC and a battery temperature Tb. The battery temperature Tb is detected by the temperature sensor (not shown) attached to the battery 36. The power storage ratio SOC is a ratio of the amount of power, which can be discharged from the battery 36, to the total capacity of the battery 36.

In the electric vehicle 20 of the embodiment configured as described above, the electronic control unit 70 sets a requested torque Tp* that is requested for traveling (requested for a driving shaft 26) based on the accelerator operation amount Acc and the vehicle speed V, sets the set requested torque Tp* as a torque command Tm* of the motor 32, and performs switching control of the switching elements of the inverter 34 such that the motor 32 is driven by the torque command Tm*.

Figure 3:
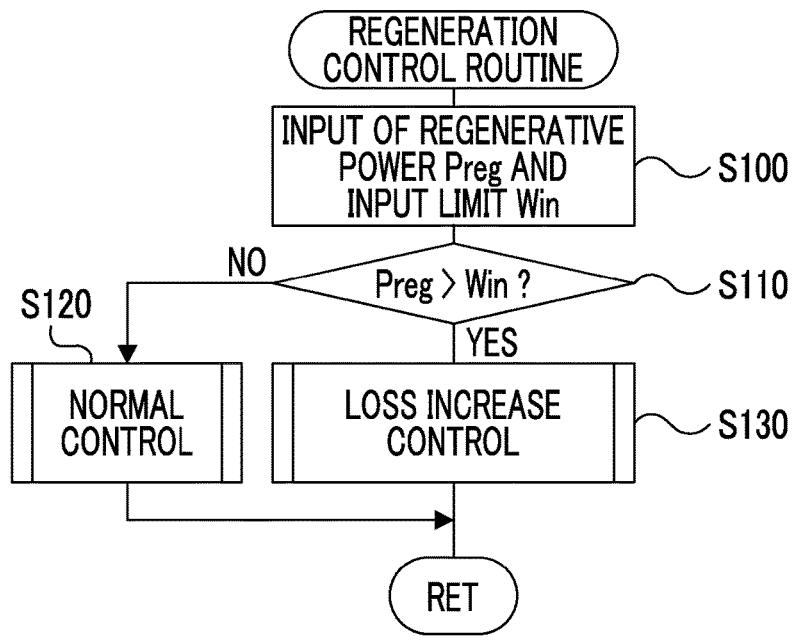
FIG. 3 is a flowchart showing an example of a regeneration control routine executed by an electronic control unit.

The operation of the electric vehicle 20 of the embodiment configured as described above, in particular, the operation of controlling the first and second boost converters 40, 41 when the motor 32 is subjected to the regeneration control will be described. FIG. 3 is a flowchart showing an example of a regeneration control routine executed by the electronic control unit 70. The routine is repeatedly executed.

When the regeneration control routine is executed, the electronic control unit 70 executes a process of inputting the input limit Win of the battery 36 and regenerative power Preg that is obtained by the regeneration control of the motor 32 by the inverter 34 (step S100). The regenerative power Preg can be calculated from the torque command Tm* of the motor 32 and the number of rotations Nm of the motor 32, or can be calculated based on the current flowing in the high voltage side power line 42 and the voltage VH of the capacitor 46.

Whether or not the input regenerative power Preg is greater than the input limit Win of the battery 36 is determined (step S110). When determination is made that the regenerative power Preg is equal to or less than the input limit Win, normal control of the first and second boost converters 40, 41 is executed (step S120), and the routine ends. In the normal control, the first and second boost converters 40, 41 are controlled such that the loss of each of the first and second boost converters 40, 41 is minimized.

Figure 4:
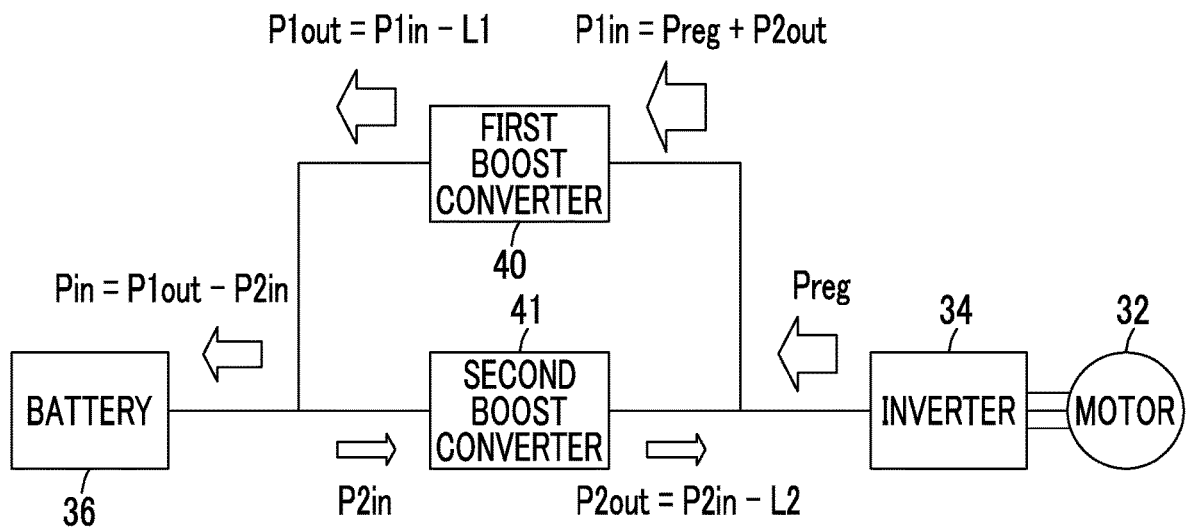
FIG. 4 is an explanatory diagram showing an example of a flow of power in the driving device.

Meanwhile, when determination is made that the regenerative power Preg is greater than the input limit Win, loss increase control in which the first and second boost converters 40, 41 are controlled such that the loss of each of the first and second boost converters 40, 41 is increased is executed (step S130), and the routine ends. In the embodiment, as shown in FIG. 4, in the loss increase control, control (regeneration control) is performed such that power from the inverter 34 side (the motor 32 side) is output to the battery 36 side by the first boost converter 40, and control (powering control) is performed such that power from the battery 36 side is output to the inverter 34 side (the motor 32 side) by the second boost converter 41. In this case, power P1in that is input to the first boost converter 40 is calculated as the sum of the regenerative power Preg obtained by the inverter 34 and power P2out that is output to the inverter 34 side (the motor 32 side) by the second boost converter 41. The first boost converter 40 receives the power P1in from the inverter 34 side (the motor 32 side), and outputs, to the battery 36 side, power P1out that is obtained by subtracting a loss L1 by the first boost converter 40 from the power P1in. The second boost converter 41 receives power P2in from the battery 36 side, and outputs, to the inverter 34 side (the motor 32 side), power P2out that is obtained by subtracting a loss L2 by the second boost converter 41 from the power P2in. Accordingly, power Pin that is obtained by subtracting the power P2in input to the second boost converter 41, from the power P1out output from the first boost converter 40 is input to the battery 36. Outlined arrows in FIG. 4 illustrate respective power. As shown in the drawings, the power from the inverter 34 side (the motor 32 side) is output to the battery 36 side by the first boost converter 40 and the power from the battery 36 side is output to the inverter 34 side (the motor 32 side) by the second boost converter 41 so that a loop of power passing through the first boost converter 40 and the second boost converter 41 is formed. As the magnitude of the looping power is increased, the loss L1 of the first boost converter 40 and the loss L2 of the second boost converter 41 are increased. When the sum of the loss L1 and the loss L2 is equal to the difference (Preg−Win) between the regenerative power Preg and the input limit Win of the battery 36, the power Pin input to the battery 36 is equal to the input limit Win.

Many cases in which determination is made that the regenerative power Preg is greater than the input limit Win correspond to the fact that the input limit Win is small because the power storage ratio SOC of the battery 36 is relatively large. In this case, it is preferable that the power Pin input to the battery 36 is reduced as much as possible. In the embodiment, in consideration of the above circumstances, the loss increase control routine shown in FIG. 5 is executed as the loss increase control. In the loss increase control routine, the first boost converter 40 is controlled to be maximally driven to the regeneration side (step S200), and the power P2in that is input to the second boost converter 41 is calculated (step S210) as a value obtained by subtracting the regenerative power Preg from the maximum output power P1outmax that is output from the first boost converter 40 when the first boost converter 40 is maximally driven to the regeneration side. The second boost converter 41 is controlled to be driven to the powering side such that the power P2in is input to the second boost converter 41 and the power is output to the inverter 34 side (the motor 32 side) (step S220), and the routine ends. In this case, since the sum of the loss L1 and the loss L2 is greater than the difference (Preg−Win) between the regenerative power Preg and the input limit Win of the battery 36, the power Pin input to the battery 36 becomes smaller than the input limit Win. When the sum of the loss L1 and the loss L2 is adjusted to be equal to or slightly greater than the difference (Preg−Win) between the regenerative power Preg and the input limit Win of the battery 36, the power Pin input to the battery 36 becomes equal to or slightly smaller than the input limit Win.

In the driving device of the embodiment described above, in a case where the regenerative power Preg by the inverter 34 is greater than the input limit Win of the battery 36, the first and second boost converters 40, 41 are controlled such that the loss of each of the first and second boost converters 40, 41 is greater than the minimum value of a loss of the normal control. In this manner, the power Pin that is input to the battery 36 can be equal to or less than the input limit Win, and thus it is possible to efficiently suppress limiting the regenerative torque of the motor 32 due to the power Pin that is input to the battery 36 exceeding the input limit Win. That is, it is possible to efficiently suppress the overcharging of the battery 36 and to cause the motor 32 to output a needed regenerative torque.

In the driving device mounted in the electric vehicle 20 of the embodiment, two boost converters of the first boost converter 40 and the second boost converter 41 are adopted, but three or more boost converters may be adopted.

In the driving device mounted in the electric vehicle 20 of the embodiment, one battery 36 is adopted as the power storage device, but a capacitor may be used instead of the battery 36.

In the embodiment, a form of a driving device mounted in the electric vehicle 20 that travels using the power from the motor 32 is adopted. However, a form of a driving device mounted in a hybrid vehicle that travels using the power from the motor and the power from the engine may be adopted, or a form of a driving device provided in a non-moving facility, such as construction equipment, may be adopted.

The correspondence between the main elements of the embodiment and the main elements described in "SUMMARY" will be described. In the embodiment, the motor 32 is an example of a "motor", the battery 36 is an example of a "power storage device", the first and second boost converters 40, 41 are examples of "first and second boost converters", and the electronic control unit 70 is an example of a "control device".

The correspondence between the main elements of the embodiment and the main elements described in "SUMMARY" is an example for specifically describing "DETAILED DESCRIPTION OF EMBODIMENTS" of which embodiments are described in "SUMMARY", and does not limit the elements described in "SUMMARY". That is, the interpretation of the disclosure described in "SUMMARY" should be made based on the description in "SUMMARY", and the embodiment is just a specific example described in "SUMMARY".

While the mode for carrying out the embodiment has been described, the disclosure is not limited to such an embodiment, and can be carried out in various forms without departing from the spirit and scope of the disclosure.

The disclosure can be used in the manufacturing industry of a driving device and the like.

What is claimed is:

1. A driving device comprising:
   a motor;
   a power storage device;
   a first boost converter configured to exchange power by voltage conversion between a power storage device side and a motor side;
   a second boost converter connected to the first boost converter in parallel and configured to exchange power by voltage conversion between the power storage device side and the motor side; and
   an electronic control unit configured to control the first boost converter and the second boost converter,
   wherein the electronic control unit controls the first boost converter and the second boost converter such that when an excessive power input from the motor side to the power storage device is present, the first boost converter and the second boost converter continue to work so as to prevent the power storage device from exceeding a charge threshold while allowing a loss of each of the first boost converter and the second boost converter to be greater than a predetermined minimum loss value of normal control, and
   wherein, during the excessive power input, the electronic control unit individually controls the first boost converter and the second boost converter by controlling one boost converter of the first boost converter and the second boost converter such that power is supplied from the motor side to the power storage device side, and by controlling the other boost converter of the first boost converter and the second boost converter such that power is supplied from the power storage device side to the motor side.

2. The driving device according to claim 1, wherein, during the excessive power input, the electronic control unit performs control such that the loss of each of the first boost converter and the second boost converter is allowed to reach a predetermined maximum loss value.

3. The driving device according to claim 1, wherein, during the excessive power input, the electronic control unit performs control such that power input to the power storage device is equal to or less than the input limit.

4. The driving device according to claim 1, wherein, during the excessive power input, the electronic control unit controls the first boost converter and the second boost converter such that the loss of each of the first boost converter and the second boost converter is allowed to be greater than the predetermined minimum loss value of the normal control.

5. The driving device according to claim 1, wherein the power input to the power storage device is power obtained by subtracting second power input to the other boost converter from first power output from the one boost converter.

* * * * *